United States Patent
Dominguez Romero et al.

(10) Patent No.: US 9,237,484 B2
(45) Date of Patent: Jan. 12, 2016

(54) METHOD, SYSTEM AND DEVICE FOR CONFIGURING RADIO ACCESS BEARERS IN MOBILE NETWORKS WITH MULTI-RAB CAPABILITY

(71) Applicant: Vodafone IP Licensing Limited, Newbury, Berkshire (GB)

(72) Inventors: Francisco Javier Dominguez Romero, Madrid (ES); Andrea De Pasquale, Madrid (ES); Clara Serrano Solsona, Madrid (ES)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 99 days.

(21) Appl. No.: 14/092,577

(22) Filed: Nov. 27, 2013

(65) Prior Publication Data
US 2014/0160983 A1 Jun. 12, 2014

(30) Foreign Application Priority Data

Feb. 27, 2015 (ES) .................................. 201231855

(51) Int. Cl.
*H04W 28/22* (2009.01)
*H04W 16/10* (2009.01)
*H04L 5/00* (2006.01)
*H04W 36/00* (2009.01)
*H04W 76/02* (2009.01)

(52) U.S. Cl.
CPC .............. *H04W 28/22* (2013.01); *H04W 16/10* (2013.01); *H04L 5/0064* (2013.01); *H04W 36/0027* (2013.01); *H04W 76/025* (2013.01)

(58) Field of Classification Search
None
See application file for complete search history.

(56) References Cited

U.S. PATENT DOCUMENTS

| | | | | |
|---|---|---|---|---|
| 4,962,497 | A * | 10/1990 | Ferenc et al. | 370/354 |
| 6,693,892 | B1 * | 2/2004 | Rinne et al. | 370/348 |
| 7,551,546 | B2 * | 6/2009 | Ma et al. | 370/208 |

(Continued)

FOREIGN PATENT DOCUMENTS

| | | |
|---|---|---|
| EP | 2437445 A1 | 4/2012 |
| WO | WO 2006107480 A2 | 10/2006 |

(Continued)

OTHER PUBLICATIONS

Spanish Search Report for 201231855 dated Nov. 29, 2012.
European Search Report for EP 13194596 dated May 6, 2014.

*Primary Examiner* — Kerri Rose
(74) *Attorney, Agent, or Firm* — Workman Nydegger (57) ABSTRACT

Method and network entities for providing good performance for voice in multiRAB connection for services of a CS+PS call setup (31) without high throughput necessity but providing good throughput for the services needing it. A differentiation of the multiRAB configuration (bearer type, mobility parameters and channel switching timers), based on service detection, is performed either in the RAN either in the CN indicating eventually this detection to the RAN. If the detected service needs high bit rate/throughput (35), the RNC reconfigures the multiRAB configuration (37) so that a bearer type providing high throughput is allocated to said service and the RNC reassigns mobility and channel switching parameters to maximise this throughput and the radio resources. If the service does not require high throughput (34), the RNC configures a bearer type and parameters for mobility and channel switching as specified by the standards to provide good performance (36), low dropped call rate.

13 Claims, 7 Drawing Sheets

(56) References Cited

U.S. PATENT DOCUMENTS

2005/0107107 A1* 5/2005 Shahidi et al. ............... 455/522
2005/0250505 A1* 11/2005 Rasanen ...................... 455/450
2010/0034115 A1* 2/2010 Busch .......................... 370/252
2012/0069750 A1* 3/2012 Xing et al. ................... 370/252

FOREIGN PATENT DOCUMENTS

| WO | WO 2007069941 A1 | 6/2007 |
| WO | WO 2009038368 A1 | 3/2009 |
| WO | WO 2012036789 A1 | 3/2012 |

* cited by examiner

METHOD, SYSTEM AND DEVICE FOR CONFIGURING RADIO ACCESS BEARERS IN MOBILE NETWORKS WITH MULTI-RAB CAPABILITY

CROSS REFERENCE TO RELATED APPLICATIONS

This application claims priority to Spanish Application Number 201231855, filed on Nov. 29, 2012, the entirety of which is incorporated herein by reference.

TECHNICAL FIELD OF THE INVENTION

The present invention has its application within the telecommunications sector and, especially, in the industrial area engaged in providing Radio Access Networks (RANs) with elements of cellular infrastructures such as Radio Network Controllers (RNCs) for Third Generation (3G) wireless communications systems supporting High-Speed Packet Access (HSPA) or Evolved High-Speed Packet Access (HSPA+) together with the traditional Circuit Switched (CS) voice calls.

More particularly, the invention described herein relates to a method and system for configuring a Radio Access Bearer (RAB) for a Packet Switched (PS) service, based on Packet Inspection or Quality of Service (QoS), in multi-Radio Access Bearer (multi-RAB) mobile network scenarios.

BACKGROUND OF THE INVENTION

Radio access bearers (RABs) are specific data flow conduits that identify the service that the Access Stratum (AS) provides to the Non Access Stratum (NAS) in UMTS (Universal Mobile Telecommunications System) for transfer of user data between the User Equipment (UE) and the Core Network (CN). In UMTS, multi Radio Access Bearer (multi-RAB) capability gives the possibility to have two or more simultaneous RABs to support simultaneous communication over the radio access network (RAN) with multiple service access points.

Therefore, in current UTRAN (UMTS Terrestrial Radio Access Network) systems, it is possible to setup a multiRAB connection, having established simultaneously: a CS RAB for a voice call and a PS RAB (or more) to carry the PS data traffic.

RAB Combination allows the radio bearer management to combine different classes of Packet Data Protocol (PDP) context to provide different services simultaneously, e.g. Voice over IP (VoIP) and video streaming. Specific RAB combinations can be too many to list. Following are examples of RAB combination types, for UpLink (UL) and DownLink (DL), specified for CS+PS channels by the standardization group 3GPP in the Technical Report (TR) TR 25.993 "Typical examples of Radio Access Bearers (RABs) and Radio Bearers (RBs) supported by Universal Terrestrial Radio Access (UTRA)", Release 8.0.0, p.p. 28-287 (section 7.—"Examples of Radio Bearers and Signalling Radio Bearers for FDD"), May 2008.

RAB Combinations of voice+Release 99 PS channel for UL and DL.

| | |
|---|---|
| Conversational/speech/UL: 12.2 DL: 12.2 kbps/CS RAB + Interactive or background/UL: 32 DL: 8 kbps/PS RAB + UL: 3.4 DL: 3.4 kbps SRBs for DCCH. | AMR + PS IB 32/8 |
| Conversational/speech/UL: 12.2 DL: 12.2 kbps/CS RAB + Interactive or background/UL: 0 DL: 0 kbps/PS RAB + UL: 3.4 DL: 3.4 kbps SRBs for DCCH (FDD) | AMR + PS IB 0/0 |
| Conversational/speech/UL: 12.2 DL: 12.2 kbps/CS RAB + Interactive or background/UL: 8 DL: 8 kbps/PS RAB + UL: 3.4 DL: 3.4 kbps SRBs for DCCH (FDD) | AMR + PS IB 8/8 |
| Conversational/speech/UL: 12.2 DL: 12.2 kbps/CS RAB + Interactive or background/UL: 32 DL: 32 kbps/PS RAB + UL: 3.4 DL: 3.4 kbps SRBs for DCCH (FDD) | AMR + PS IB 32/32 |
| Conversational/speech/UL: 12.2 DL: 12.2 kbps/CS RAB + Interactive or background/UL: 32 DL: 32 kbps/PS RAB (20 ms TTI) + UL: 3.4 DL: 3.4 kbps SRBs for DCCH (FDD) | AMR + PS IB 32/32 (TTI 20) |
| Conversational/speech/UL: (12.2 7.95 5.9 4.75) DL: (12.2 7.95 5.9 4.75) kbps/CS RAB + Interactive or background/ UL: 0 DL: 0 kbps/PS RAB + UL: 3.4 DL: 3.4 kbps SRBs for DCCH. (FDD) | Multi-AMR + PS IB 0/0 |
| Conversational/speech/UL: (12.2 7.95 5.9 4.75) DL: (12.2 7.95 5.9 4.75) kbps/CS RAB + Interactive or background/ UL: 8 DL: 8 kbps/PS RAB + UL: 3.4 DL: 3.4 kbps SRBs for DCCH. (FDD) | Multi-AMR + PS IB 8/8 |
| Conversational/speech/UL: (12.2 7.95 5.9 4.75) DL: (12.2 7.95 5.9 4.75) kbps/CS RAB + Interactive or background/ UL: 16 DL: 16 kbps/PS RAB + UL: 3.4 DL: 3.4 kbps SRBs for DCCH. (FDD) | Multi-AMR + PS IB 16/16 |
| Conversational/speech/UL: (12.2 7.95 5.9 4.75) DL: (12.2 7.95 5.9 4.75) kbps/CS RAB + Interactive or background/ UL: 32 DL: 32 kbps/PS RAB + UL: 3.4 DL: 3.4 kbps SRBs for DCCH. (FDD) | Multi-AMR + PS IB 32/32 |
| Conversational/speech/UL: (12.2 7.95 5.9 4.75) DL: (12.2 7.95 5.9 4.75) kbps/CS RAB + Interactive or background/ UL: 64 DL: 64 kbps/PS RAB + UL: 3.4 DL: 3.4 kbps SRBs for DCCH. (FDD) | Multi-AMR + PS IB 64/64 |
| Conversational/speech/UL: (12.2 7.95 5.9 4.75) DL: (12.2 7.95 5.9 4.75) kbps/CS RAB + Interactive or background/ UL: 64 DL: 128 kbps/PS RAB + UL: 3.4 DL: 3.4 kbps SRBs for DCCH. (FDD) | Multi-AMR + PS IB 64/128 |
| Conversational/speech/UL: 12.2 DL: 12.2 kbps/CS RAB + Interactive or background/UL: 32 DL: 64 kbps/PS RAB + UL: 3.4 DL: 3.4 kbps SRBs for DCCH. | AMR + PS IB 32/64 |

-continued

| | |
|---|---|
| Conversational/speech/UL: 12.2 DL: 12.2 kbps/CS RAB + Interactive or background/UL: 64 DL: 64 kbps/PS RAB + UL: 3.4 DL: 3.4 kbps SRBs for DCCH. | AMR + PS IB 64/64 |
| Conversational/speech/UL: 12.2 DL: 12.2 kbps/CS RAB + Interactive or background/UL: 64 DL: 128 kbps/PS RAB + UL: 3.4 DL: 3.4 kbps SRBs for DCCH. | AMR + PS IB 64/128 |
| Conversational/speech/UL: 12.2 DL: 12.2 kbps/CS RAB + Interactive or background/UL: 64 DL: 256 kbps/PS RAB + UL: 3.4 DL: 3.4 kbps SRBs for DCCH. | AMR + PS IB 64/256 |
| Conversational/speech/UL: 12.2 DL: 12.2 kbps/CS RAB + Interactive or background/UL: 64 DL: 384 kbps/PS RAB + UL: 3.4 DL: 3.4 kbps SRBs for DCCH. | AMR + PS IB 64/384 |
| Conversational/speech/UL: 12.2 DL: 12.2 kbps/CS RAB + Interactive or background/UL: 64 DL: 2048 kbps/PS RAB + UL: 3.4 DL: 3.4 kbps SRBs for DCCH. | AMR + PS IB 64/2048 |
| Conversational/speech/UL: 12.2 DL: 12.2 kbps/CS RAB + Interactive or background/UL: 128 DL: 2048 kbps/PS RAB + UL: 3.4 DL: 3.4 kbps SRBs for DCCH. | AMR + PS IB 128/2048 |
| Conversational/speech/UL: 12.2 DL: 12.2 kbps/CS RAB + Interactive or background/UL: 128 DL: 64 kbps/PS RAB + UL: 3.4 DL: 3.4 kbps SRBs for DCCH. | AMR + PS IB 128/64 |
| Conversational/speech/UL: 12.2 DL: 12.2 kbps/CS RAB + Interactive or background/UL: 384 DL: 64 kbps/PS RAB + UL: 3.4 DL: 3.4 kbps Signalling Radio Bearers for DCCH | AMR + PS IB 384/64 |
| Conversational/speech/UL: 12.2 DL: 12.2 kbps/CS RAB + Interactive or background/UL: 384 DL: 128 kbps/PS RAB + UL: 3.4 DL: 3.4 kbps Signalling Radio Bearers for DCCH | AMR + PS IB 384/128 |
| Conversational/speech/UL: 12.2 DL: 12.2 kbps/CS RAB + Interactive or background/UL: 384 DL: 384 kbps/PS RAB + UL: 3.4 DL: 3.4 kbps Signalling Radio Bearers for DCCH | AMR + PS IB 384/384 |
| Conversational/speech/UL: 5.9 DL: 5.9 kbps/CS RAB + Interactive or background/UL: 64 DL: 64 kbps/PS RAB + UL: 3.4 DL: 3.4 kbps SRBs for DCCH | AMR at 5.9 + PS IB 64/64 |
| Conversational/speech/UL: (12.65 8.85 6.6) DL: (12.65 8.85 6.6) kbps/CS RAB + Interactive or background/ UL: 64 DL: 64 kbps/PS RAB + UL: 3.4 DL: 3.4 kbps SRBs for DCCH + DL: 0.15 kbps SRB#5 for DCCH | WB-AMR (max 23.85) + PS IB 64/64 + SRB#5 |
| Conversational/speech/UL: (12.65 8.85 6.6) DL: (12.65 8.85 6.6) kbps/CS RAB + Interactive or background/ UL: 64 DL: 128 kbps/PS RAB + UL: 3.4 DL: 3.4 kbps SRBs for DCCH + DL: 0.15 kbps SRB#5 for DCCH | WB-AMR (max 12.65) + PS IB 64/128 + SRB#5 |
| Conversational/speech/UL: (12.65 8.85 6.6) DL: (12.65 8.85 6.6) kbps/CS RAB + Interactive or background/ UL: 64 DL: 384 kbps/PS RAB + UL: 3.4 DL: 3.4 kbps SRBs for DCCH + DL: 0.15 kbps SRB#5 for DCCH | WB-AMR (max 12.65) + PS IB 64/384 + SRB#5 |
| Conversational/speech/UL: (12.65 8.85 6.6) DL: (12.65 8.85 6.6) kbps/CS RAB + Interactive or background/ UL: 0 DL: 0 kbps/PS RAB + UL: 3.4 DL: 3.4 kbps SRBs for DCCH + DL: 0.15 kbps SRB#5 for DCCH | WB-AMR (max 12.65) + PS IB 0/0 + SRB#5 |
| Conversational/speech/UL: (12.65 8.85 6.6) DL: (12.65 8.85 6.6) kbps/CS RAB + Interactive or background/ UL: 8 DL: 8 kbps/PS RAB + UL: 3.4 DL: 3.4 kbps SRBs for DCCH + DL: 0.15 kbps SRB#5 for DCCH | WB-AMR (max 12.65) + PS IB 8/8 + SRB#5 |
| Conversational/speech/UL: (12.65 8.85 6.6) DL: (12.65 8.85 6.6) kbps/CS RAB + Interactive or background/ UL: 32 DL: 32 kbps/PS RAB + UL: 3.4 DL: 3.4 kbps SRBs for DCCH + DL: 0.15 kbps SRB#5 for DCCH | WB-AMR (max 12.65) + PS IB 32/32 + SRB#5 |
| Conversational/speech/UL: (12.65 8.85 6.6) DL: (12.65 8.85 6.6) kbps/CS RAB + Interactive or background/ UL: 64 DL: 256 kbps/PS RAB + UL: 3.4 DL: 3.4 kbps SRBs for DCCH + DL: 0.15 kbps SRB#5 for DCCH | WB-AMR (max 12.65) + PS IB 64/256 + SRB#5 |
| Conversational/speech/UL: (12.65 8.85 6.6) DL: (12.65 8.85 6.6) kbps/CS RAB + Conversational/unknown/ UL: 64 DL: 64 kbps/CS RAB + UL: 3.4 DL: 3.4 kbps SRBs for DCCH + DL: 0.15 kbps SRB#5 for DCCH | WB-AMR (max 12.65) + PS IB 64/64 + SRB#5 |
| Conversational/speech/UL: (12.65 8.85 6.6) DL: (12.65 8.85 6.6) kbps/CS RAB + Interactive or background/ UL: 32 DL: 32 kbps/PS RAB (20 ms TTI) + UL: 3.4 DL: 3.4 kbps SRBs for DCCH + DL: 0.15 kbps SRB#5 for DCCH | WB-AMR (max 12.65) + PS IB 32/32 (20 ms) + SRB#5 |
| Conversational/speech/UL: 12.2 DL: 12.2 kbps/CS RAB + Streaming/unknown/UL: 16 DL: 128 kbps/PS RAB + Interactive or background/UL: 8 DL: 8 kbps/PS RAB + UL: 3.4 DL: 3.4 kbps SRBs for DCCH | AMR + PS S 16/128 + PS IB 8/8 |

| | |
|---|---|
| Conversational/speech/UL: 12.2 DL: 12.2 kbps/CS RAB + Streaming/unknown/UL: 128 DL: 16 kbps/PS RAB + Interactive or background/UL: 8 DL: 8 kbps/PS RAB + UL: 3.4 DL: 3.4 kbps SRBs for DCCH | AMR + PS S 128/16 + PS IB 8/8 |
| Conversational/speech/UL: 12.2 DL: 12.2 kbps/CS RAB + Streaming/unknown/UL: 64 DL: 16 kbps/PS RAB + Interactive or background/UL: 8 DL: 8 kbps/PS RAB + UL: 3.4 DL: 3.4 kbps SRBs for DCCH | AMR + PS S 64/16 + PS IB 8/8 |
| Conversational/speech/UL: 12.2 DL: 12.2 kbps/CS RAB + Streaming/unknown/UL: 32 DL: 256 kbps/PS RAB + Interactive or background/UL: 8 DL: 8 kbps/PS RAB + UL: 3.4 DL: 3.4 kbps SRBs for DCCH | AMR + PS S 32/256 + PS IB 8/8 |
| Conversational/speech/UL: 12.2 DL: 12.2 kbps/CS RAB + Streaming/unknown/UL: 128 DL: 16 kbps/PS RAB + Interactive or background/UL: 8 DL: 8 kbps/PS RAB + UL: 3.4 DL: 3.4 kbps SRBs for DCCH—Alternative | AMR + PS S 128/16 + PS IB 8/8 (alternative PDU 336 bits) |
| Conversational/speech/UL: 12.2 DL: 12.2 kbps/CS RAB + Interactive or background/UL: 64 DL: 64 kbps/PS RAB + Interactive or background/UL: 64 DL: 64 kbps/PS RAB + UL: 3.4 DL: 3.4 kbps SRBs for DCCH (FDD) | AMR + PS IB 64/64 + PS IB 64/64 |
| Conversational/speech/UL: 12.2 DL: 12.2 kbps/CS RAB + Interactive or Background/UL: 0 DL: 0 kbps/PS RAB + Interactive or Background/UL: 0 DL: 0 kbps/PS RAB + UL: 3.4 DL: 3.4 kbps SRBs for DCCH | AMR + PS IB 0/0 + PS IB 0/0 |
| Conversational/speech/UL: 12.2 DL: 12.2 kbps/CS RAB + Interactive or background/UL: 0 DL: 0 kbps/PS RAB + Interactive or background/UL: 0 DL: 0 kbps/PS RAB + UL: 3.4 DL: 3.4 kbps SRBs for DCCH (L1 multiplexing) | AMR + PS IB 0/0 + PS IB 0/0 |
| Conversational/speech/UL: 5.9 DL: 5.9 kbps/CS RAB + Interactive or background/UL: 64 DL: 64 kbps/PS RAB + Interactive or background/UL: 64 DL: 64 kbps/PS RAB + UL: 3.4 DL: 3.4 kbps SRBs for DCCH | AMR at 5.9 + PS IB 64/64 + PS IB 64/64 |
| Conversational/speech/UL: (12.65 8.85 6.6) DL: (12.65 8.85 6.6) kbps/CS RAB + Interactive or background/UL: 0 DL: 0 kbps/PS RAB + Interactive or background/UL: 0 DL: 0 kbps/PS RAB + UL: 3.4 DL: 3.4 kbps SRBs for DCCH + DL: 0.15 kbps SRB#5 for DCCH | WB-AMR + PS IB 0/0 + PS IB 0/0 + SRB#5 |
| Conversational/speech/UL: (12.65 8.85 6.6) DL: (12.65 8.85 6.6) kbps/CS RAB + Interactive or background/UL: 64 DL: 64 kbps/PS RAB + Interactive or background/UL: 64 DL: 64 kbps/PS RAB + UL: 3.4 DL: 3.4 kbps SRBs for DCCH + DL: 0.15 kbps SRB#5 for DCCH | WB-AMR + PS IB 64/64 + PS IB 64/64 + SRB#5 |
| Conversational/speech/UL: (12.65 8.85 6.6) DL: (12.65 8.85 6.6) kbps/CS RAB + Interactive or background/UL: 128 DL: 128 kbps/PS RAB + Interactive or background/UL: 128 DL: 128 kbps/PS RAB + UL: 3.4 DL: 3.4 kbps SRBs for DCCH + DL: 0.15 kbps SRB#5 for DCCH | WB-AMR + PS IB 128/128 + PS IB 128/128 + SRB#5 |

RAB Combinations of Voice+(HSDPA Channel in DL and Release 99 PS Channel in UL)

| | |
|---|---|
| RB for Conversational/speech/UL: 12.2 DL: 12.2 kbps/ CS RAB + Interactive or background/UL: 384 DL: [Bit rate depending on the UE category & RAB maximum bit rate]/ PS RAB + UL: 3.4 DL: 3.4 kbps SRBs for DCCH | AMR + PS IB 384/HS |
| RB for Conversational/speech/UL: 12.2 DL: 12.2 kbps/ CS RAB + Interactive or background/UL: 64 DL: [Bit rate depending on the UE category & RAB maximum bit rate]/ PS RAB + UL: 3.4 DL: 3.4 kbps SRBs for DCCH | AMR + PS IB 64/HS |
| RB for Conversational/speech/UL: (12.2 7.95 5.9 4.75) DL: (12.2 7.95 5.9 4.75) kbps/CS RAB + Interactive or background/UL: 64 DL: [Bit rate depending on the UE category & RAB maximum bit rate]/PS RAB + UL: 3.4 DL: 3.4 kbps SRBs for DCCH | Multi-AMR + PS IB 64/HS |
| RB for Conversational/speech/UL: (12.2 7.95 5.9 4.75) DL: (12.2 7.95 5.9 4.75) kbps/CS RAB + RB for Interactive or background/UL: 128 DL: [Bit rate depending on the UE category & RAB maximum bit rate]/PS RAB + UL: 3.4 DL: 3.4 kbps SRBs for DCCH | Multi-AMR + PS IB 128/HS |
| RB for Conversational/speech/UL: 12.2 DL: 12.2 kbps/ CS RAB + RB for Interactive or background/UL: 128 DL: [Bit rate depending on the UE category & RAB maximum bit rate]/PS RAB + UL: 3.4 DL: 3.4 kbps SRBs for DCCH | AMR + PS IB 128/HS |

-continued

| | |
|---|---|
| RB for Conversational/speech/UL: 5.9 DL: 5.9 kbps/CS RAB + RB for Interactive or background/UL: 64 DL: [max bit rate depending on the UE category & RAB max. bitrate]/ PS RAB + UL: 3.4 DL: 3.4 kbps SRBs for DCCH | AMR at 5.9 + PS IB 64/HS |
| Conversational/speech/UL: (12.65 8.85 6.6) DL: (12.65 8.85 6.6) kbps/CS RAB + Interactive or Background/ UL: 384 DL: [Bit rate depending on the UE category]/PS RAB + UL: 3.4 DL: 3.4 kbps SRBs for DCCH + DL: 0.15 kbps SRB#5 for DCCH | WB-AMR + PS IB 384/HS + SRB#5 |
| RB for Conversational/speech/UL: (12.65 8.85 6.6) DL: (12.65 8.85 6.6) kbps/CS RAB + Interactive or Background/UL: 64 DL: [Bit rate depending on the UE category]/PS RAB + UL: 3.4 DL: 3.4 kbps SRBs for DCCH + DL: 0.15 kbps SRB#5 for DCCH | WB-AMR + PS IB 64/HS + SRB#5 |
| RB for Conversational/speech/UL: 5.9 DL: 5.9 kbps/CS RAB + RB for Interactive or background/UL: 64 DL: [max bit rate depending on the UE category & RAB max. bitrate]/ PS RAB + RB for Interactive or background/UL: 64 DL: [max bit rate depending on the UE category & RAB max. bitrate]/PS RAB + UL: 3.4 DL: 3.4 kbps SRBs for DCCH | AMR at 5.9 + PS IB 64/HS + PS IB 64/HS |
| RB for Conversational/speech/UL: 12.2 DL: 12.2 kbps/ CS RAB + RB for Interactive or background/UL: 64 DL: [max bit rate depending on the UE category & RAB max. bitrate]/PS RAB + RB for Interactive or background/ UL: 64 DL: [max bit rate depending on the UE category & RAB max. bitrate]/PS RAB + UL: 3.4 DL: 3.4 kbps SRBs for DCCH | AMR + PS IB 64/HS + PS IB 64/HS |
| RB for Conversational/speech/UL: (12.65 8.85 6.6) DL: (12.65 8.85 6.6) kbps/CS RAB + RB for Interactive or Background/UL: 64 DL: [Bit rate depending on the UE category & RAB maximum bit rate]/PS RAB + RB for Interactive or Background/UL: 64 DL: [Bit rate depending on the UE category & RAB maximum bit rate]/PS RAB + UL: 3.4 DL: 3.4 kbps SRBs for DCCH + DL: 0.15 kbps SRB#5 for DCCH | WB-AMR + PS IB 64/HS + PS IB 64/HS |

RAB Combinations of Voice+(HSDPA Channel in DL and E-DCH-HSUPA-PS Channel in UL)

| | |
|---|---|
| RB for Conversational/speech/UL: 12.2 DL: 12.2 kbps/ CS RAB + Interactive or background/UL: [max bit rate depending on UE category and TTI] DL: [max bit rate depending on UE category]/PS RAB + UL: 3.4 DL: 3.4 kbps SRBs for DCCH on DCH | AMR + PS IB E-DCH/HS |
| Conversational/speech/UL: (5.9, 4.75) DL: (5.9, 4.75) kbps/CS RAB + Interactive or background/UL: [max bit rate depending on UE category and TTI] DL: [max bit rate depending on UE category]/PS RAB + UL: 3.4 DL: 3.4 kbps SRBs for DCCH on DCH | AMR at 5.9, 4.75 + PS IB E-DCH/HS |
| Conversational/speech/UL: (12.65 8.85 6.6) DL: (12.65 8.85 6.6) kbps/CS RAB + Interactive or background/ UL: [max bit rate depending on UE category and TTI] DL: [max bit rate depending on UE category]/PS RAB + UL: 3.4 DL: 3.4 kbps SRBs for DCCH on DCH + DL: 0.15 kbps SRB#5 for DCCH | WB-AMR + PS IB E-DCH/HS + SRB#5 |
| RB for Conversational/speech/UL: (12.2 7.95 5.9 4.75) DL: (12.2 7.95 5.9 4.75) kbps/CS RAB + RB for Interactive or background/UL: [max bit rate depending on UE category and TTI] DL: [max bit rate depending on UE category]/PS RAB + RB for Interactive or background/UL: [max bit rate depending on UE category and TTI] DL: [max bit rate depending on UE category]/PS RAB + UL: 3.4 DL: 3.4 kbps SRBs for DCCH on DCH | Multi-AMR + PS IB E-DCH/HS + PS IB E-DCH/HS |
| RB for Conversational/speech/UL: 12.2 DL: 12.2 kbps/ CS RAB + RB for Interactive or background/UL: [max bit rate depending on UE category and TTI] DL: [max bit rate depending on UE category]/PS RAB + RB for Interactive or background/UL: [max bit rate depending on UE category and TTI] DL: [max bit rate depending on UE category]/PS RAB + UL: 3.4 DL: 3.4 kbps SRBs for DCCH on DCH | AMR + PS IB E-DCH/HS + PS IB E-DCH/HS |

| | |
|---|---|
| RB for Conversational/speech/UL: (12.65 8.85 6.6) DL: (12.65 8.85 6.6) kbps/CS RAB + RB for Interactive or background/UL: [max bit rate depending on UE category and TTI] DL: [max bit rate depending on UE category]/PS RAB + RB for Interactive or background/UL: [max bit rate depending on UE category and TTI] DL: [max bit rate depending on UE category]/PS RAB + UL: 3.4 DL: 3.4 kbps SRBs for DCCH on DCH + DL: 0.15 kbps SRB#5 for DCCH | WB-AMR + PS IB E-DCH/HS + PS IB E-DCH/HS + SRB#5 |
| RB for Conversational/speech/UL: (12.65 8.85 6.6) DL: (12.65 8.85 6.6) kbps/CS RAB + RB for Interactive or background/UL: [max bit rate depending on UE category and TTI] DL: [max bit rate depending on UE category]/PS RAB + RB for Interactive or background/UL: [max bit rate depending on UE category and TTI] DL: [max bit rate depending on UE category]/PS RAB + UL: 3.4 DL: 3.4 kbps SRBs for DCCH on DCH | WB-AMR + PS IB E-DCH/HS + PS IB E-DCH/HS |
| RB for Conversational/speech/UL: 12.2 DL: 12.2 kbps/ CS RAB + RB for Interactive or background/UL: [max bit rate depending on UE category and TTI] DL: [max bit rate depending on UE category]/PS RAB + RB for Interactive or background/UL: [max bit rate depending on UE category and TTI] DL: [max bit rate depending on UE category]/PS RAB + RB for Interactive or background/UL: [max bit rate depending on UE category and TTI] DL: [max bit rate depending on UE category]/PS RAB + UL: 3.4 DL: 3.4 kbps SRBs for DCCH on DCH | AMR + PS IB E-DCH/HS + PS IB E-DCH/HS + PS IB E-DCH/HS |
| RB for Conversational/speech/UL: (12.2 7.95 5.9 4.75) DL: (12.2 7.95 5.9 4.75) kbps/CS RAB + RB for Interactive or background/UL: [max bit rate depending on UE category and TTI] DL: [max bit rate depending on UE category]/PS RAB + RB for Interactive or background/UL: [max bit rate depending on UE category and TTI] DL: [max bit rate depending on UE category]/PS RAB + RB for Interactive or background/UL: [max bit rate depending on UE category and TTI] DL: [max bit rate depending on UE category]/PS RAB + UL: 3.4 DL: 3.4 kbps SRBs for DCCH on DCH | Multi-AMR + PS IB E-DCH/HS + PS IB E-DCH/HS + PS IB E-DCH/HS |
| Conversational/speech/UL: 12.2 kbps DL: 12.2 kbps/ CS RAB on E-DCH and HS-DSCH + (1, 2 or 3) Interactive or background/UL: [max bit rate depending on UE category and TTI] DL: [max bit rate depending on UE category]/PS RABs + UL: [max bit rate depending on UE category and TTI] DL: [max bit rate depending on UE category] SRBs for DCCH on E-DCH and HS-DSCH | AMR over HSPA + PS IB E-DCH/HS + PS IB E-DCH/HS + PS IB E-DCH/HS + SRB on E-DCH/DCH |
| Conversational/speech/UL: (12.2, 7.95, 5.9, 4.75) kbps DL: (12.2, 7.95, 5.9, 4.75) kbps/CS RAB on E-DCH and HS-DSCH + (1, 2 or 3) Interactive or background/UL: [max bit rate depending on UE category and TTI] DL: [max bit rate depending on UE category]/PS RABs + UL: [max bit rate depending on UE category and TTI] DL: [max bit rate depending on UE category] SRBs for DCCH on E-DCH and HS-DSCH | Multi-AMR over HSPA + PS IB E-DCH/HS + PS IB E-DCH/HS + PS IB E-DCH/HS + SRB on E-DCH/DCH |
| Conversational/speech/UL: (5.9, 4.75) kbps DL: (5.9, 4.75) kbps/CS RAB on E-DCH and HS-DSCH + (1, 2 or 3) Interactive or background/UL: [max bit rate depending on UE category and TTI] DL: [max bit rate depending on UE category]/PS RABs + UL: [max bit rate depending on UE category and TTI] DL: [max bit rate depending on UE category] SRBs for DCCH on E-DCH and HS-DSCH | Multi-AMR (5.9, 4.75) over HSPA + PS IB E-DCH/HS + PS IB E-DCH/HS + PS IB E-DCH/HS + SRB on E-DCH/DCH |
| RB for Conversational/speech/UL: (12.65 8.85 6.6) DL: (12.65 8.85 6.6) kbps/CS RAB + RB for Interactive or background/UL: [max bit rate depending on UE category and TTI] DL: [max bit rate depending on UE category]/PS RAB + RB for Interactive or background/UL: [max bit rate depending on UE category and TTI] DL: [max bit rate depending on UE category]/PS RAB + RB for Interactive or background/UL: [max bit rate depending on UE category and TTI] DL: [max bit rate depending on UE category]/PS RAB + UL: 3.4 DL: 3.4 kbps SRBs for DCCH on DCH | WB-AMR + PS IB E-DCH/HS + PS IB E-DCH/HS + PS IB E-DCH/HS |

-continued

| | |
|---|---|
| Conversational/speech/UL: (12.65 8.85 6.6) kbps DL: (12.65 8.85 6.6) kbps/CS RAB on E-DCH and HS-DSCH + (1, 2 or 3) Interactive or background/UL: [max bit rate depending on UE category and TTI] DL: [max bit rate depending on UE category]/PS RABs + UL: [max bit rate depending on UE category and TTI] DL: [max bit rate depending on UE category] SRBs for DCCH on E-DCH and HS-DSCH | WB-AMR over HSPA + PS IB E-DCH/HS + PS IB E-DCH/HS + PS IB E-DCH/HS |

E-DCH: Enhanced Dedicated Channel
HSUPA: High Speed Uplink Packet Access
HSDPA: High Speed Downlink Packet Access
(WB)-AMR: (Widband-) Adaptive MultiRate
IB: Interactive/Background
HS: High Speed A Release 99 downlink channel providing a throughput such as 384 Kbps for MultiRAB is less robust to interference and results in a dropped call rate 20% worse (worse performance) than using 64 Kbps. For uplink case, there is a 40% improvement when using Release 99 instead of using a—HSUPA—high speed channel.

Nowadays, with the increase of the always-on applications in the smartphones, the probability of having a multiRAB connection during a voice call is higher, so the overall voice quality is impacted. In order to mitigate this negative effect, special configurations are used by the operators: for example, mobile network operators configure the use of Release 99 channels for the PS DCH bearer, which has a better performance than the HSPA channels in multiRAB scenarios. The disadvantage of this approach is that the throughput (data bit rate) is impacted (decreased) for the PS service.

Then, a main problem of this multiRAB connection is that the performance is not as good as the single CS voice RAB because the probability of dropped calls in the multiRAB connection is higher than the single RAB. More particularly, the reasons are the following:

Since more than one channel is transmitting at the same time, the power and signal to interference ratio requirements are higher for being able to receive and decode a multiRAB connection than for a single bearer.

Standard signalling traffic in MultiRAB mode is higher than the involved in signalling flow of Single RAB mode and current UTRAN systems are not optimized to handle this MultiRAB signalling with the same performance than in Single RAB mode. All the signalling in MultiRAB goes over the same Signalling Radio Bearer (SRB), which is a radio bearer that carries signalling—typically DownLink Dedicated Control (DCCH)—data channel. If one message is not delivered correctly, then the full channel is dropped.

Parameters for Mobility Management (e.g., handover parameters) in MultiRAB are not optimised by standard specifications. CS+PS session is handled either by the CS or by the PS criteria, but mechanisms to consider MultiRAB as a distinctive entity are not available within standards. This can lead to non-optimised parametrisation of one of the multiple bearers for CS+PS calls in multiRAB mode.

There is therefore a need to optimise RAB configuration aiming to the best compromise between performance (i.e., call dropping probability or rate of dropped calls) and service throughput (i.e., rate of successful packet delivery) in the cases of CS+PS services over multi-RAB connections in 3G networks.

SUMMARY OF THE INVENTION

The present invention serves to solve the aforesaid problem by providing a method and 3G network entities for configuring radio access bearers in mobile networks granting the best performance for every service in the multiRAB cases where voice and data are used simultaneously.

An aspect of the invention refers to a method for multiRAB configuration in 3G networks, which comprises the steps of:
  setup of an initial multiRAB configuration for a Circuit Switched and Packet Switched (CS+PS) call (predefined for carrying traffic of voice and data services of the CS+PS call according to 3GPP standard specifications), comprising:
    an initial bearer type for each (voice and data) services of the CS+PS call
    initial mobility parameters which determine handovers, and
    initial channel switching parameters determined by channel switching timers (initially configured in the RNC);
  detection of at least one PS service (e.g., by packet inspecting into the CS+PS call traffic) and checks (either in the Radio Access Network or in the Core Network) whether the detected PS service requires a high data bit rate and if so, the method modifies the initial multiple radio access bearer configuration by:
    replacing the initial bearer type for the detected PS service by a specific bearer type providing high data bit rate (e.g., HSPA or HSPA+),
    prioritizing inter-frequency handover ahead of inter-RAT handover for said detected PS service,
    shortening the channel switching timers (used by the RNC for channel switching traffic transmission).

Another aspect of the invention deals with a 3G radio access network entity which comprises processing means for performing the method described before. And another aspect of the invention deals with a 3G system which comprises at least one network entity performing the method described before.

A further aspect of the invention refers to a computer program product which comprises program code means to be loaded into processing means of a network node running a radio access network entity, e.g., a Radio Network Controller, in order to execute the described method.

In particular, the invention may be found in a method for configuring radio access bearers in mobile networks, comprising the steps of: setting up an initial multiple radio access bearer configuration for a CS+PS call traffic, the CS+PS call being setup for simultaneous circuit switched and packet switched services; detecting in CS+PS call traffic at least one PS service and checking whether the detected PS service requires a data bit rate greater than a non-zero threshold, defining a high data bit rate; and modifying the initial multiple radio access bearer configuration to allow continued CS+PS call traffic using the multiple radio access bearer configuration, if the detected PS service requires the high data bit rate.

The initial multiple radio access bearer configuration preferably comprises: an initial bearer type for each, voice and data, services of the CS+PS call; initial mobility parameters which determine handovers, and initial channel switching parameters determined by channel switching timers.

Modifying the initial multiple radio access bearer configuration optionally comprises one or more of: replacing the initial bearer type for the detected PS service by a specific bearer type providing high data bit rate; prioritizing inter-frequency handover ahead of inter-radio access technology handover for said detected PS service; and shortening the channel switching timers. The specific bearer type providing high data bit rate may be selected from HSPA bearer and HSPA+ bearer. Modifying the initial multiple radio access bearer configuration may be performed in the radio access network.

In some embodiments, detecting at least one PS service comprises a data packet inspection of the CS+PS call traffic. Data packet inspection may be performed in the radio access network or in the core network. In some embodiments, detecting at least one PS service comprises triggering a request of high data bit rate from at least one core network entity involved in setting up the detected service. Detecting at least one PS service may be performed in the core network. Then, the method may further comprise sending an indication of QoS parameters for the detected service from the core network to the radio access network.

In another aspect, there is provided a Radio Access Network entity, comprising a process or, configured to perform the method described herein.

In a further aspect, there is provided a system for configuring radio access bearers in mobile networks, comprising a Radio Access Network entity having a process or that is configured to perform the method described herein. The Radio Access Network entity may further comprise a data packet inspection module configured to detect at least one PS service in the CS+PS call traffic. Additionally or alternatively, the system further comprises a Core Network entity comprising a data packet inspection module configured to detect at least one PS service in the CS+PS call traffic. Optionally, the system may further comprise a Core Network entity configured to set up the detected service and comprising a triggering module configured to trigger a request of the high data bit rate. The system may comprise the Core Network entity. This may further comprise a communications interface configured to send an indication of QoS parameters for the detected service to the radio access network entity.

In yet another aspect, there is provided a computer program product comprising program code which, when loaded into processor of a node in a radio access network, makes said program code execute the method described herein.

DESCRIPTION OF THE DRAWINGS

To complete the description that is being made and with the object of assisting in a better understanding of the characteristics of the invention, in accordance with a preferred example of practical embodiment thereof, accompanying said description as an integral part thereof, is a set of drawings wherein, by way of illustration and not restrictively, the following has been represented.

DETAILED DESCRIPTION OF THE INVENTION

A preferred embodiment of the invention is focused on a system for configuring radio access bearers in a 3G network using multiRAB connections.

Figure 1:
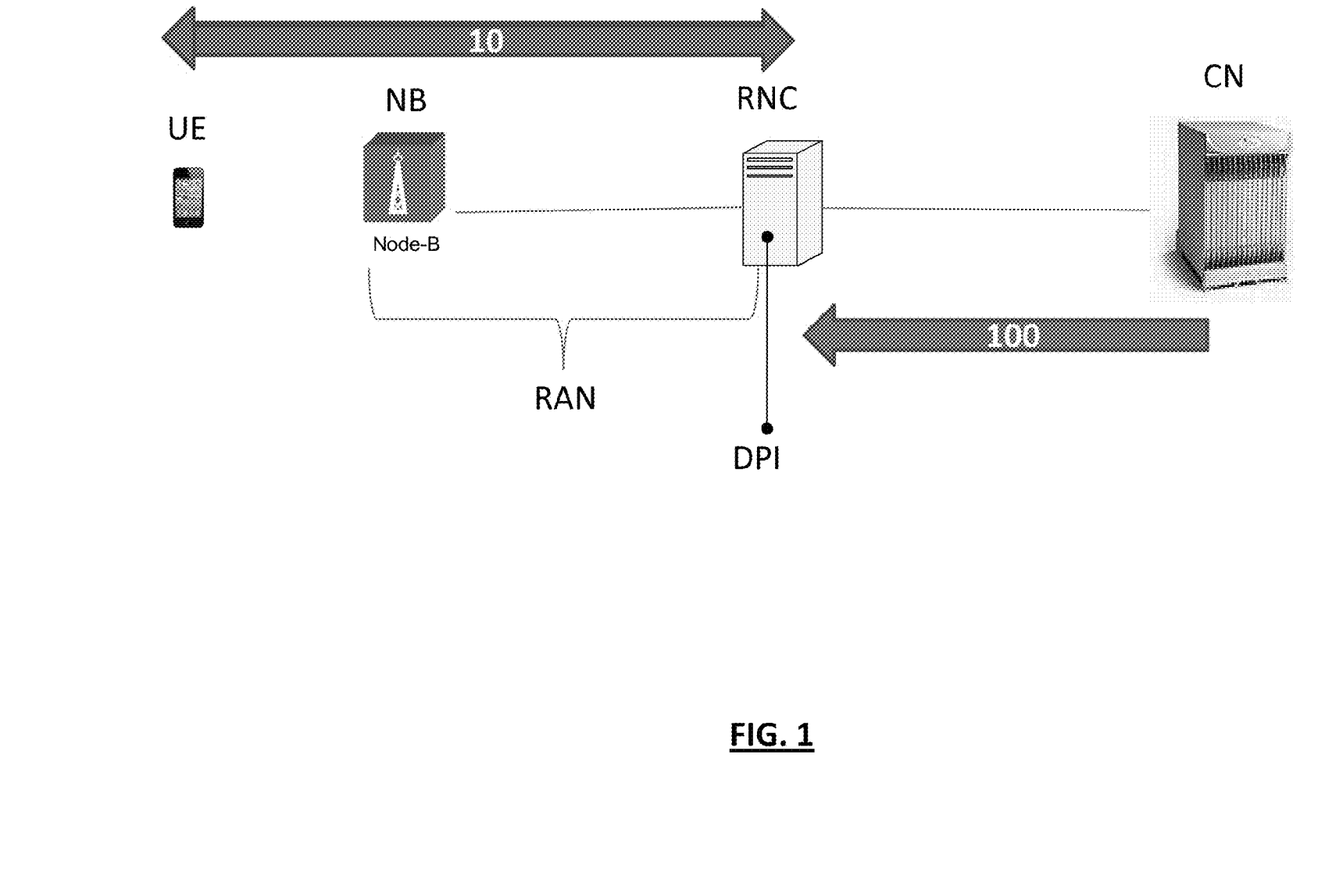
FIG. 1 shows a block diagram of the system architecture for multiRAB configuration involving radio access network entities in accordance with a possible embodiment of the invention.

FIG. 1 shows a possible architecture implementation of the system. Basically, a multiRAB connection (10) is setup between a User Equipment (UE) and a Radio Network Controller (RNC) through a 3G base station or Node-B (NB). The Radio Network Controller (RNC) is provided with data packet inspection (DPI) software in order to detect specific services by inspecting the packets (100) from the Core Network (CN), which are carried over a data or PS channel. When the Radio Network Controller (RNC) detects a service requiring high throughput, said Radio Network Controller (RNC) changes the configuration of the multiRAB connection (10). This change can be performed in any of two ways:
  The RNC sends a standard Radio Bearer Reconfiguration message to the UE in order to change the bearer type.
  The RNC changes its internal mobility and channel switching parameters to optimise the usage of radio resources and maximise the throughput reached.

Figure 2:
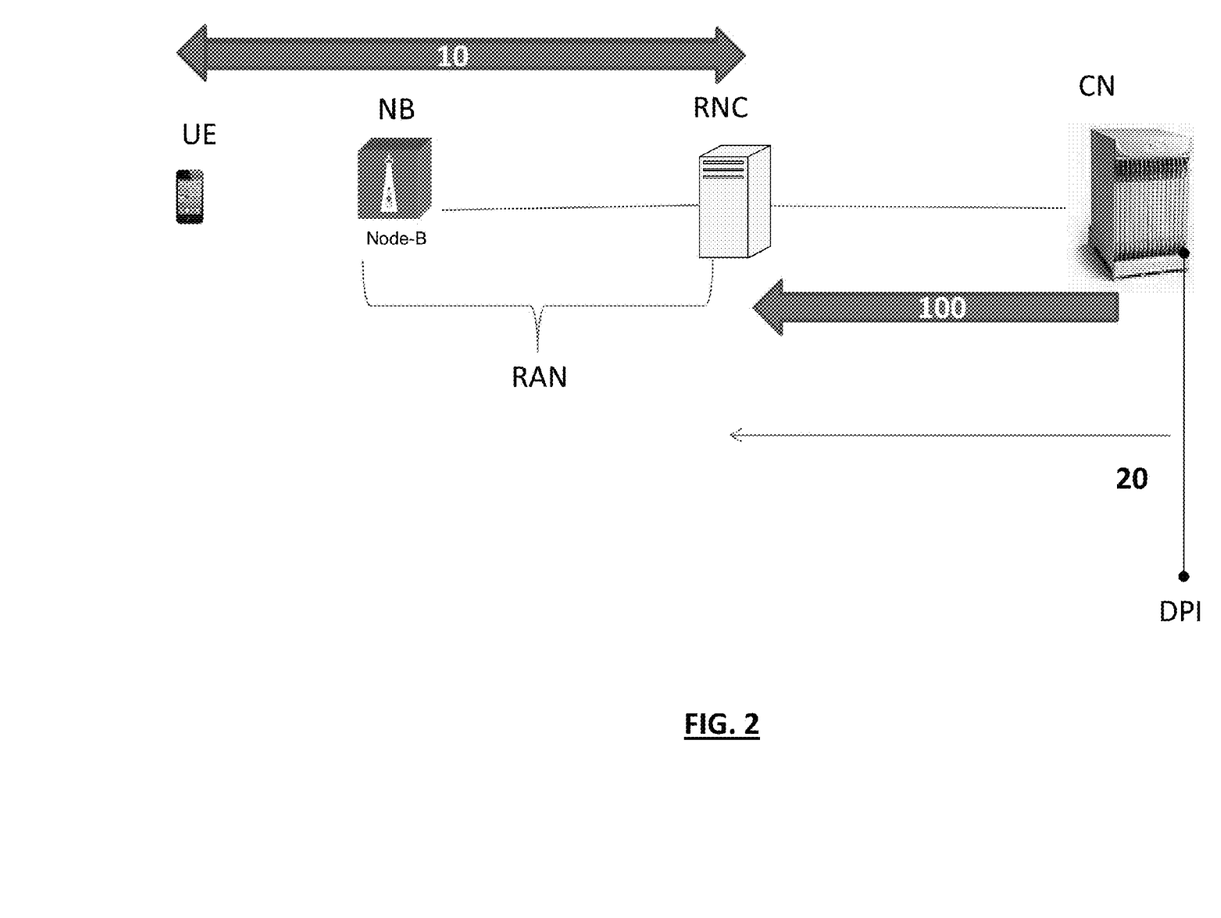
FIG. 2 shows a block diagram of the system architecture for multiRAB configuration involving radio access network and core network entities in accordance with another possible embodiment of the invention.

FIG. 2 shows another possible architecture of the system. As described in the previous implementation option, the multiRAB connection (10) is setup between the UE and the RNC through the Node-B (NB). The difference of implementation option shown in FIG. 2 with respect to the one in FIG. 1 is that there are two ways to detect a specific service:
  i) Performing Packet Inspection by a network entity of the CN, similarly to the service detection by the RNC described in the previous implementation of FIG. 1.
  ii) Trigger the radio resources, which comply with the specific requirements of service throughput, directly from the network elements involved in the service setup.

Once the service is detected through any of the aforementioned ways, the general packet radio service-GPRS— core network is in charge of indicating (20) to the RNC the way to follow when handling the detected service on the multiRAB connection (10). This indication (20) is performed by updating Quality of Service (QoS) parameters. More particularly, the Gateway GPRS support node (GGSN) updates the QoS parameters in the PDP context through a standard message UPDATE PDP Context Request, which contains specific values of UMTS QoS parameters such as Traffic Handling Priority (THP) and Allocation Retention Priority (ARP). Then the Serving GPRS support node (SGSN) automatically sends a standard RAB modification message to the RNC with these updated QoS parameters. When the RNC receives the latter message, the RNC can change the configuration of the multiRAB connection (10), as described in the previous example of FIG. 1 implementation, by one of these two aforementioned options:

The RNC sends a standard Radio Bearer Reconfiguration message to the UE in order to change the bearer type.
The RNC changes its internal mobility and channel switching parameters to optimise the usage of radio resources and maximise the throughput reached.

Another preferred embodiment of the invention is focused on a method of radio access bearer reconfiguration in a 3G network system with a multiRAB connection setup.

Figure 3:
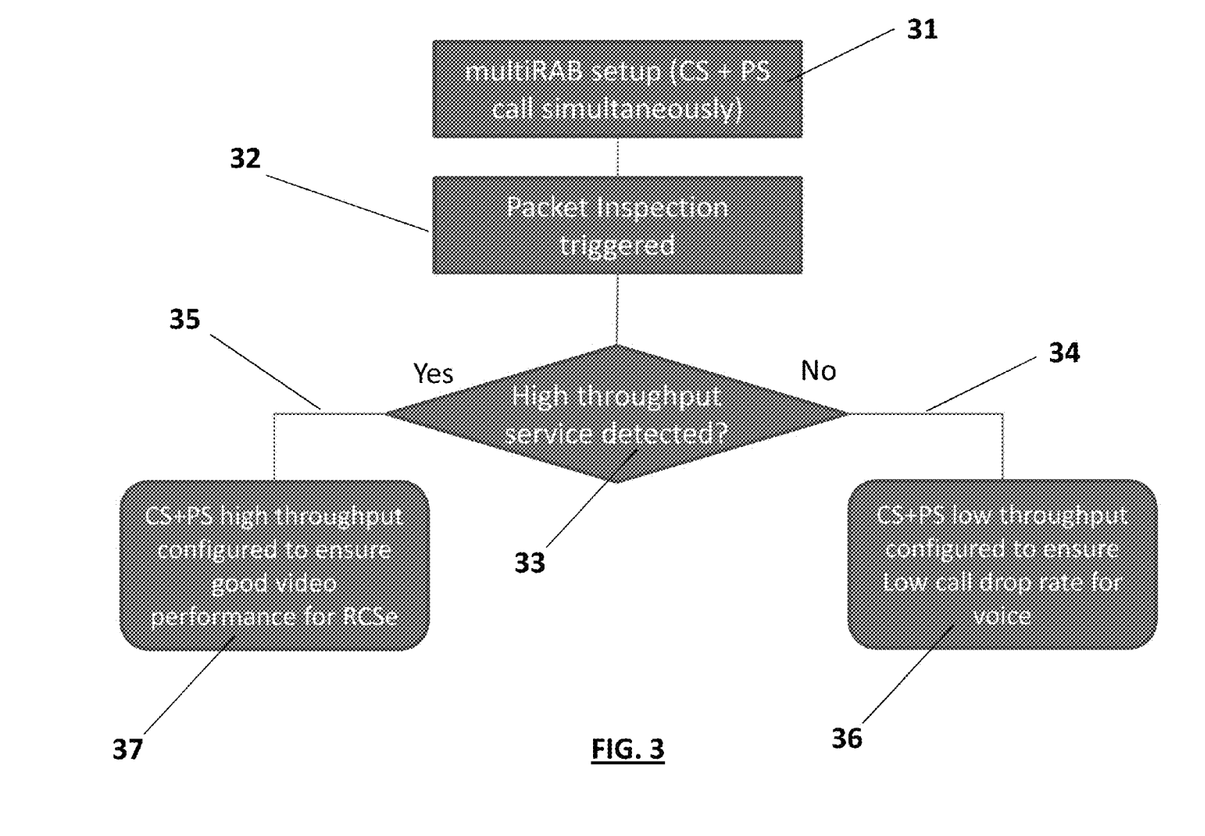
FIG. 3 shows a flow diagram of the method for configuring multiRAB configuration in the 3G system of FIG. 1 and according to another possible embodiment of the invention.

A first alternative implementation of the method, shown in FIG. 3, for configuring multiRAB connections in 3G systems, the radio access network entity, more particularly, the RNC is involved, in accordance with the system architecture of FIG. 1, and the RNC is the only one entity in charge of both:

detection of specific services, and
reconfiguration of multiRAB connection for specific services.

The first stage of the flow is the setup of a MultiRAB bearer for a CS+PS call (31) in reply to the UE asking for the establishment of a voice call plus a packet call simultaneously. At this first stage, the RNC allocates a proper initial multiRAB configuration according to the standard specifications. This initial multiRAB configuration comprises an initial bearer type, mobility and channel switching parameters in accordance with the 3GPP specifications and so that minimise the number of drop calls to provide a good voice call quality. Then, the Data Packet Inspection (DPI) software in the RNC is triggered (32) to detect the service and determine (33) whether this specific service needs a high throughput. This service detection can result into two cases:

If the detected service needs high throughput (35), the RNC reconfigures the multiRAB configuration (37) so that a bearer type providing high throughput, i.e., a high data rate, is allocated to said detected service e.g., HSPA supporting theoretical maximum data rates between 1.8 Mbps and 14.4 Mbps or the enhanced version of HSPA, called HSPA+ or Evolved HSPA, supporting data rates up to 84 Mbps for DL and 22 Mbps for UL, is the bearer type selected by the RNC for a service requiring high throughput. In addition, the RNC reassigns mobility and channel switching parameters to the detected service in case (35) in order to maximise this throughput and the radio resources. Thus, the CS+PS call setup over the multiRAB connection is configured to ensure good performance, i.e., low dropped call rate, while keeping a proper throughput for the specific services, e.g., video in Rich Communication Services or RCS.
If the detected service does not require high throughput (34), then the RNC configures a bearer type and mobility/channel switching parameters to provide low number of call drops (36).

Figure 4:
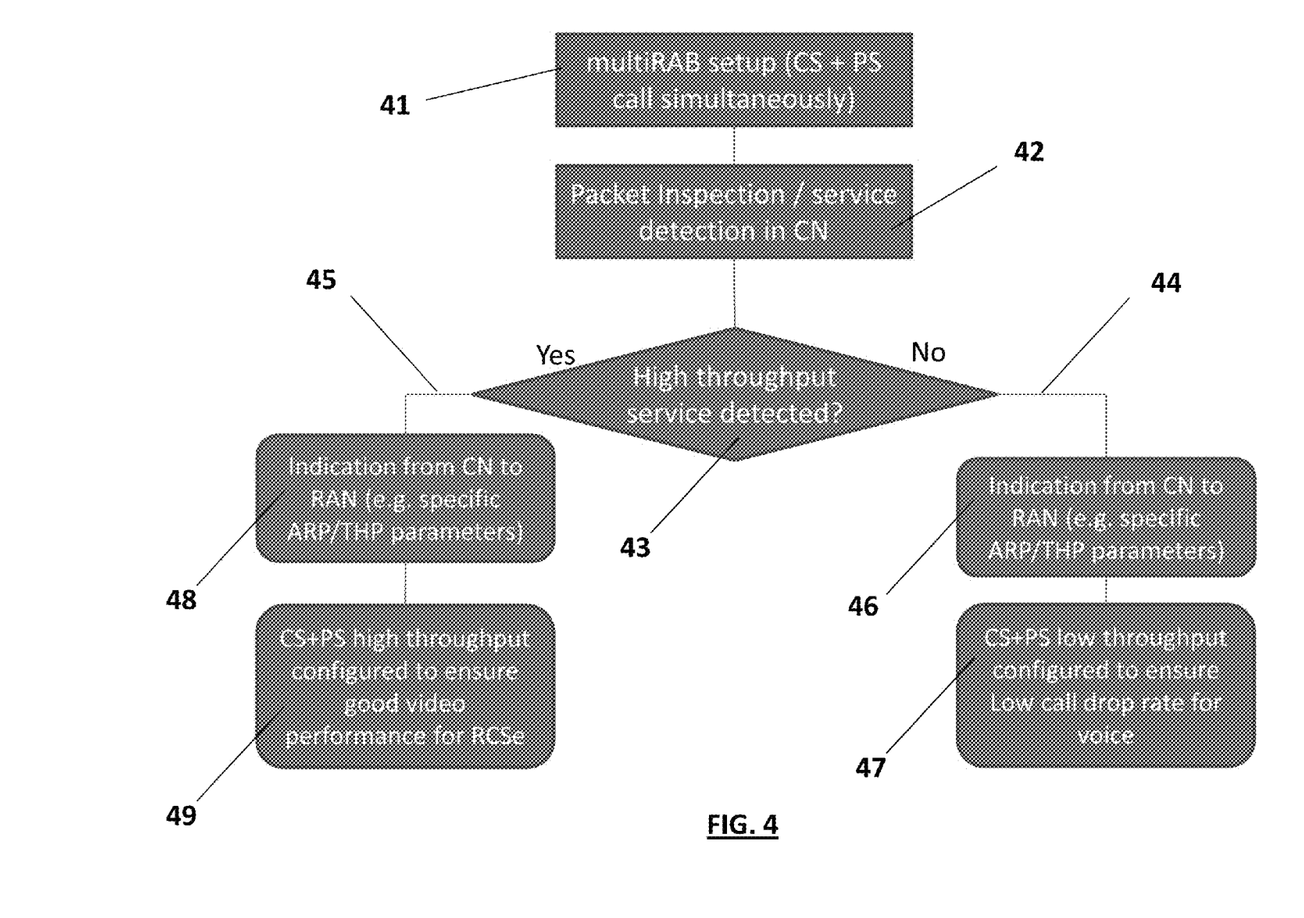
FIG. 4 shows a flow diagram of the method for configuring multiRAB configuration in the 3G system of FIG. 2 and according to a further possible embodiment of the invention.

In a second alternative implementation of the method for configuring multiRAB connections in 3G systems, shown in FIG. 4, both the RNC from the radio access network and the core network are involved, in accordance with the system architecture of FIG. 2, the CN and the RNC respectively being in charge of:

detection of specific services by the CN
reconfiguration of multiRAB connection for the detected specific services by the RNC.

The first stage (41) is again the setup of a MultiRAB bearer in order to carry a CS+PS call and the initial allocation by the RNC of a bearer type, mobility and channel switching parameters which define the initial multiRAB configuration according to the 3GPP specifications in order to minimise the number of drop calls for providing a good voice call quality. In parallel with the RNC, the Core Network checks (42) whether the PS service needs a high throughput and indicates it to the RNC. The Core Network can perform packet inspection by means of Data Packet Inspection (DPI) software in order to detect the PS service and determines whether high throughput is needed or not for said PS specific service. Then, there are again two possible cases:

if the detected service needs high throughput (45), firstly the Core Network configures specific QoS parameters, e.g., THP and ARP combinations, which are notified in an indication (48) to the RAN, and so the RNC. Then, the RNC configures (49) a bearer type, which provides high Mbps for data rate, and mobility and channel switching parameters to maximise this data rate and the radio resources for the detected service.
If the detected service does not require high throughput (44), the Core Network configures QoS parameters (46), e.g., THP, ARP, according to the 3GPP specifications and the RNC configures a bearer type and mobility/channel switching parameters that provide low number of call drops (47).

In any of the two alternatives of the method implementation described above, at the first stage (31, 41), the initial multiRAB configuration is setup by the RNC, when the UE establishes a voice call first and then a PS call or vice versa. The initial multiRAB configuration comprises a bearer type providing low drop call rate, e.g., a fixed low rate, 32 or 64 Kbps, Release 99 DCH channel for UL and DL, which grants better and more reliable performance than HSPA. The initial mobility parameters are configured by the RNC in such a way that the thresholds to start a handover from 3G to 2G are set in order to prioritize this inter-RAT handover with respect to the thresholds used to trigger an inter-frequency handover within 3G, because prioritizing inter-RAT handover leads to a lower probability of call drops. Besides, the initial parameters for channel switching, that is, configuration parameters used by the RNC to change to a different bit rate, are long to minimise the number of reconfigurations, since the probability of call drops increases with every reconfiguration to another bit rate. For example, the RNC sets a timer for channel switching to change from voice+DCH 64/64 kbps to voice+PS DCH 0/0 Kbps, e.g., the channel switching timer is initially set to 30 seconds.

The second step of the method is service detection to determine if the service requires high throughput demand and this service detection depends on the implementation option of the system architecture:

According to architecture shown in FIG. 1: Data Packet Inspection (DPI) is used in the Radio Access Network (RAN). The IP header of the packets can be inspected at a node in the RAN, e.g., the RNC preferably but also the Node B, to detect the specific services and the IP address configured for said specific services. If there are different service types coming from the same IP address, the node need to enter also in the IP payload packet to detect properly the throughput required for the specific service. This deep packet inspection can be done by the Node B or by the RNC. If packet inspection is performed at the RNC, the RNC triggers the Radio Bearer Reconfiguration and change the mobility and channel state internal parameters of the RNC itself. Otherwise, if the Node B is the RAN node in charge of packet inspection to detect the specific services, it is necessary to send an indication of the service detection to the RNC by means of a proprietary mechanism. Given the high processing power needed to implement the packet inspection feature and the higher processing capacity of the RNC compared with the NodeB, and also taking into account the avoidance of the new message from the Node B to the RNC, the preferred solution is to implement Data Packet Inspection (DPI) in the RNC.

According to architecture shown in FIG. 2: Data Packet Inspection (DPI) is used in the Core Network (CN) and an indication (20) of the service detection is sent from the CN to the RAN. The Core Network can detect which specific services are used, and then it can reconfigure some of the QoS parameters of the RAB, according to 3GPP TS 23.101, so that the radio access network can configure the bearer to provide a higher throughput— and hence a increased probability of call drops—for these specific services, whilst lower throughput—but better performance with granted low dropped call rate— is provided for the rest of the PS services in the CS+PS call on the MultiRAB.

Once the service is detected, either in the CN or in the RAN, MultiRAB reconfiguration is performed by changing, only if specific services requiring high throughput, e.g. video transmission, are detected, the following parameters:

Bearer type: As specified in 3GPP standards, such as the summarized specifications disclosed before in prior art, above, there are several types of multiRAB used in the 3G networks. For high throughput demanding services, e.g., a video service, it is better to use a voice+HSDPA/HSUPA combination in order to provide a high quality of experience. Therefore, the RNC can reconfigure the bearer type from the Voice+DCH64/64 to Voice+HSDPA/HSUPA for video service. The reconfiguration of the bearer type in a multiRAB connection is performed via Radio Bearer reconfiguration message sent from the RNC to the UE. This message is standard and specified in the 3GPP 25.331.

Mobility Parameters: The RNC can modify the mobility parameters to favour the Inter-frequency handover instead of inter-RAT handover to 2G in case that the detected service needs high throughput in order to provide HSDPA/HSUPA as much as possible. For example, the standard event 2b, as defined in 3GPP TS 25.331 V4.8.0 "3rd Generation Partnership Project; Technical Specification Group Radio Access Network; Radio Resource Control (RRC); Protocol Specification (Release 4)", December 2002, can be used in the case of an inter-frequency handover or IFHO. Event 2b, is triggered/reported by the UE when the estimated quality of the currently used frequency is below a certain threshold and the estimated quality of a non-used frequency is above a certain threshold. When event 2b is reported, a handover to new frequency, IFHO, is performed. Thus, the RNC can modify the parameters which define event 2b:

The threshold for quality of the non-used frequency. This typically is a value of good Ec/No measurement, e.g. −8 dB.

The threshold for quality of the used frequency. When the quality in the current frequency is not good, the handover to another frequency is triggered. For example this value could be −10 dB.

There are another events specified by 3GPP standards for inter-RAT handover that can be used for mobility reconfiguration. For example, the event 3a, reported by the UE when the estimated quality of the currently used UTRAN frequency is below a certain threshold and the estimated quality of the other system is above a certain threshold, as defined by 3GPP TS 25.331, can be used. In this case the RNC can modify any of the 2 parameters defining Event 3a:

The threshold for quality of the non-used system, e.g. GSM. This typically is a value of good quality value.

The threshold for quality of the used frequency. This is a threshold similar to the one used for the event 2B case. When the quality is the current frequency is not good, the handover to another frequency is triggered.

Therefore, if it is needed to favor the handover to 2G/GSM because the service does not need a high throughput, it is possible to setup the threshold quality of the event 2b lower, e.g. −12 dB, than the threshold quality of the event 3a, e.g. −10 dB, so that the handover to GSM is preferred if there are GSM cells measured by the UE. On the contrary, if the case is a high throughput demanding service, the inter-frequency handover IFHO is preferred; therefore, the RNC changes the threshold quality of the event 3a to be lower, e.g. −12 dB, than the threshold quality of the event 2b, e.g. −10 dB.

Channel Switching Parameters: The channel switching timers of the RNC are shortened in the case of a high throughput demanding service, in order to adapt the traffic transmission in a much more dynamic way. It is better to reconfigure to voice+DCH 0/0 in case that there is no traffic, to avoid any network overload that can impact eventually the quality of experience of the customers.

Figure 5:
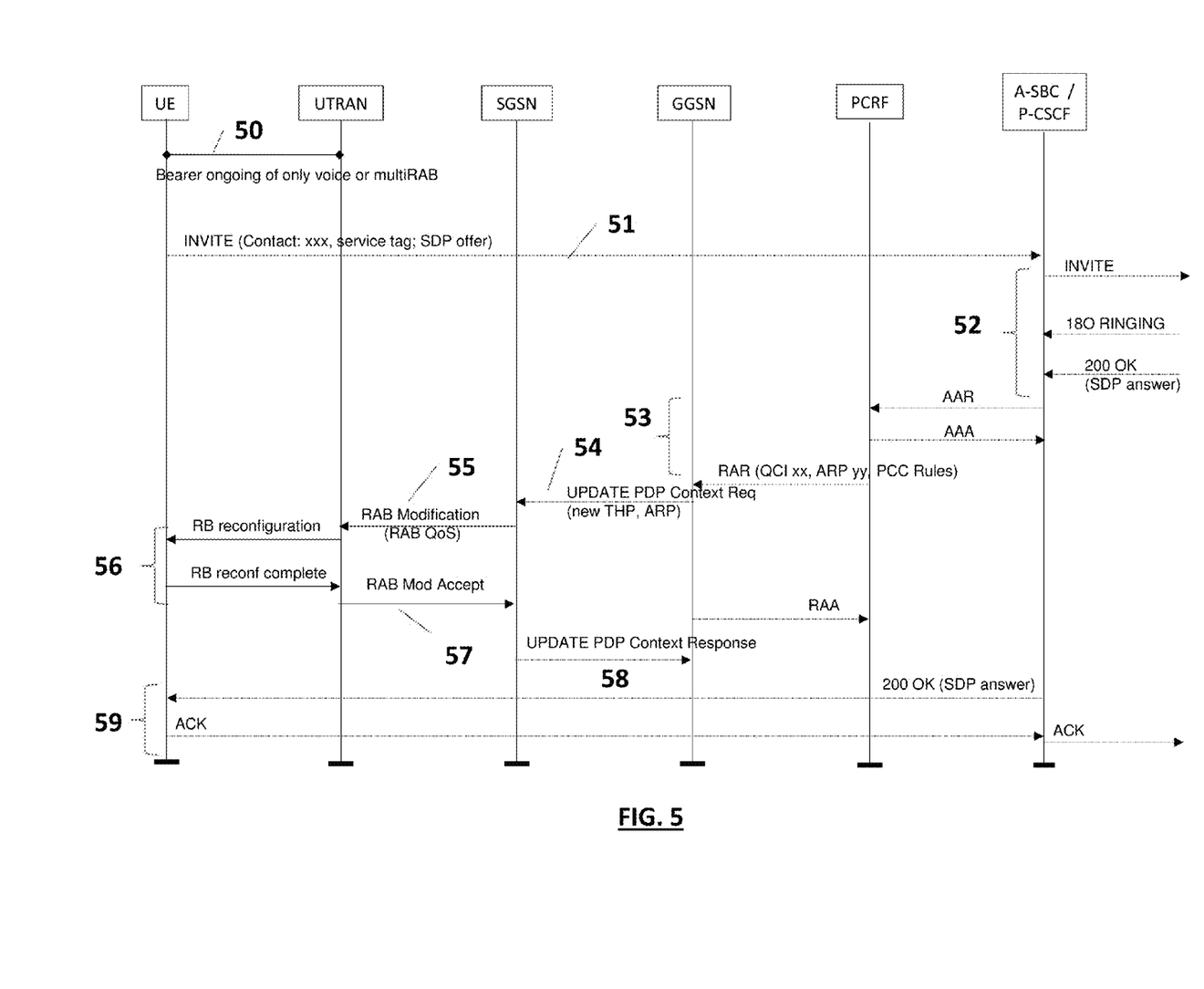
FIG. 5 shows a call flow diagram of multiRAB reconfiguration for RCSe service in accordance with a possible embodiment of the invention and in the case that the RCSe call is originated by the user equipment.
Figure 6:
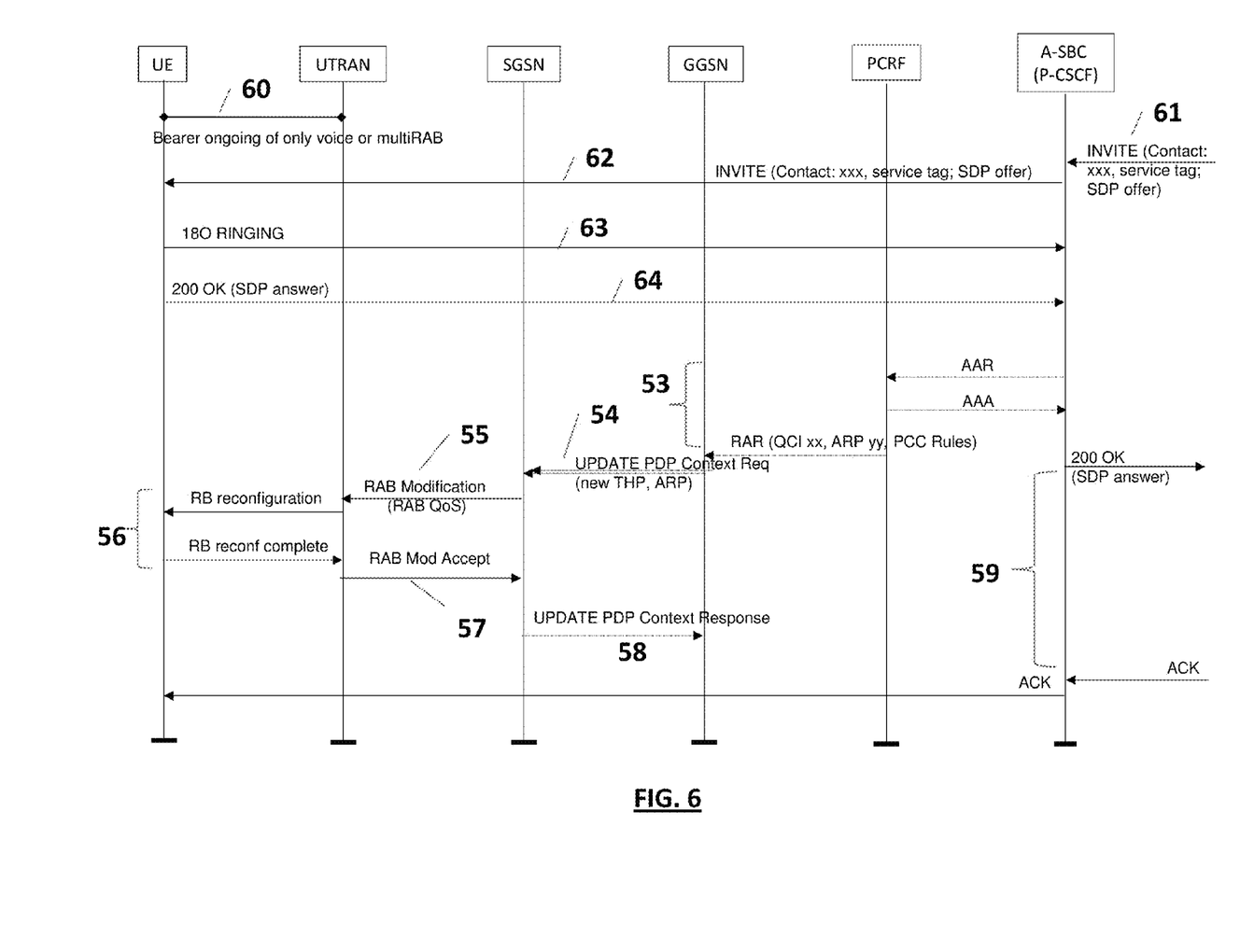
FIG. 6 shows a call flow diagram of multiRAB reconfiguration for RCSe service in accordance with a possible embodiment of the invention and in the case that the RCSe call is terminated by the user equipment.
Figure 7:
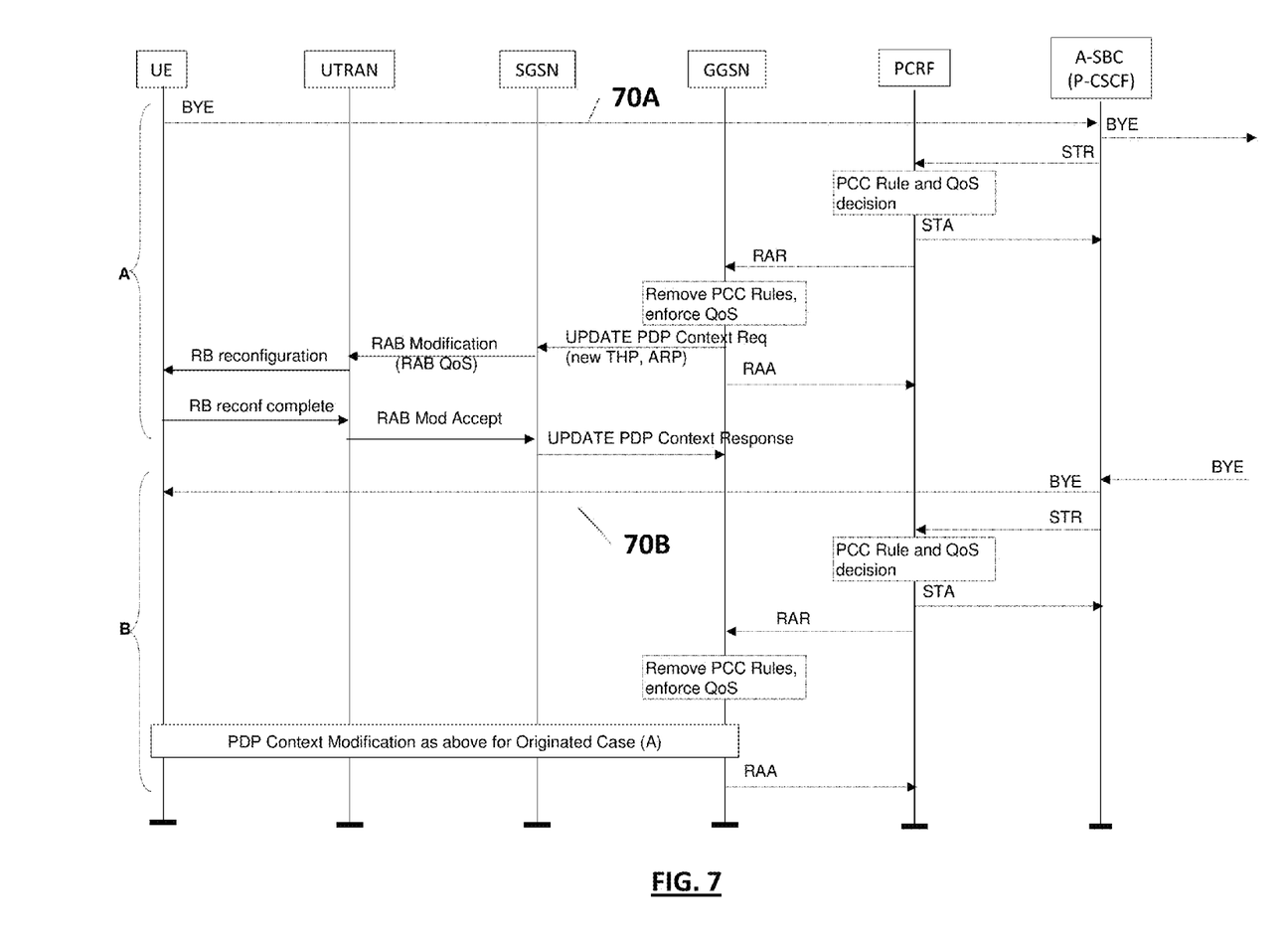
FIG. 7 shows a call flow diagram of multiRAB reconfiguration for RCSe service in accordance with a possible embodiment of the invention and in both cases of originated/terminated RCSe call by the user equipment.

FIGS. 5-7 show a possible implementation of the method for multiRAB configuration in the case that the specific PS service is the Rich Communication Service enhanced— RCSe—.

FIG. 5 shows the Call Flow when a RCSe session setup is originated by the UE with a multiRAB bearer already in use and with a trigger of allocation the service throughput requirements directly started from the network elements that make the service setup, that is, the second option of the system architecture is used: the network elements from the CN indicate the UTRAN these specific throughput requirements of the RCSe service. An only voice bearer or a multi-RAB is initially allocated (50) between the UE and the UTRAN. The UE sends an INVITE message to initiate (51) the RCSe session. This message is sent to the Core network entity playing the Access Session Border Control (A-SBC) and Proxy Call Session Control Function (P-CSCF). This network entity is in charge of the signalling plane of the RCSe session and resends the INVITE to the destination terminal, in reply of the A-SBC/P-CSCF receives a RINGING and an OK message accordingly (52). The A-SBC/P-CSCF node also sends the DIAMETER AA-Request (AAR) to the network entity playing the Policy charging and rules function (PCRF), and this network entity is configured to send a Re-Auth-Request message (RAR) in order to update subscriber parameters, once the DIAMETER AA-Answer (AAA) is sent in reply to the AAR (53). Then, following the 3GPP specifications, when the subscriber parameters are modified, QoS parameters in this example, an UPDATE of the PDP context is needed (54). The GGSN sends a Re-Auth-Answer (RAA) message to the PCRF in response to the RAR and an UPDATE PDP context Request message with the modified values of the QoS parameters to the SGSN, the latter replying with an UPDATE PDP context Response message (58) only if the modified QoS parameters are finally accepted. The SGSN indicates the UTRAN to modify the RAB by means of a RAB Modification message (55) which informs the RNC about these modified QoS parameter values. Taking into account these latest values, the RNC initiates with the UE a MultiRAB reconfiguration, as described before, to change the bearer type and internally change the mobility and channel switching parameters used by the RNC. This MultiRAB reconfiguration (56) is translated into a PDP context modification negotiated between the UE and the RNC. A MODIFY PDP context Request is sent by the network to the UE in order to request modification of the active PDP context with the modified values of the QoS parameters, e.g., new THP and ARP values. If the UE accepts these new QoS parameters (57), a MODIFY PDP context Accept message is sent to the SGSN and the UPDATE PDP context Response message is sent to the GGSN. Therefore, the RCSe session is succesfully established over the modified RAB and so, finally OK and ACK messages are exchanged between the network and the UE.

FIG. 6 shows the Call Flow when a RCSe session setup is terminated by the UE with a multiRAB bearer already in use and with a trigger of allocation the service throughput requirements directly started from the network elements that make the service setup, that is, the second option of the system architecture is used: the network elements from the CN indicate the UTRAN these specific throughput requirements of the RCSe service. An only voice bearer or a multiRAB is initially allocated (60) between the UE and the UTRAN. The difference with respect to the case of FIG. 5 is that the UE receives an RCSe session from another terminal and so the INVITE message (61) is coming from the other, originating, terminal to the A-SBC and this node forwards (62) the INVITE to the UE with the multiRAB bearer ongoing. The UE answers with the RINGING and the OK messages (63, 64) to indicate that the called UE is being rung and accept the call setup. Then the procedure follows to modify the QoS parameters and the RAB exchanging exactly the same messages described in the case of FIG. 5.

FIG. 7 shows the Call Flow of a RCSe session termination for both cases: when the UE originates (A) and terminates (B) a RCSe call setup over a multiRAB bearer already in use and with a trigger of allocation the service throughput requirements directly started from the network elements that make the service setup, that is, the second option of the system architecture is used: the network elements from the CN indicate the UTRAN these specific throughput requirements of the RCSe service. The session is closed in both cases with a BYE message (70A, 70B). Then the A-SBC sends a Session Termination Request (STR) to the PCRF. The PCRF accepts the message and sends a RAR message to the GGSN again to change the QoS parameters. Again the GGSN modifies the PDP context in the same way as described in FIGS. 5 and 6.

Note that in this text, the term "comprises" and its derivations (such as "comprising", etc.) should not be understood in an excluding sense, that is, these terms should not be interpreted as excluding the possibility that what is described and defined may include further elements, steps, etc.

The invention claimed is:

1. A method for configuring radio access bearers in mobile networks, comprising:
    setting up an initial multiple radio access bearer configuration for a CS+PS call traffic, the CS+PS call being setup for simultaneous circuit switched and packet switched services;
    detecting in CS+PS call traffic at least one PS service and checking whether the detected PS service requires a data bit rate greater than a non-zero threshold, defining a high data bit rate; and
    modifying the initial multiple radio access bearer configuration to allow continued CS+PS call traffic using the multiple radio access bearer configuration, if the detected PS service requires the high data bit rate,
    wherein the initial multiple radio access bearer configuration comprises:
        an initial bearer type for each, voice and data, services of the CS+PS call;
        initial mobility parameters which determine handovers, and
        initial channel switching parameters determined by channel switching timers.

2. The method of claim 1, wherein modifying the initial multiple radio access bearer configuration comprises one or more of:
    replacing the initial bearer type for the detected PS service by a specific bearer type providing high data bit rate,
    prioritizing inter-frequency handover ahead of inter-radio access technology handover for said detected PS service; and
    shortening the channel switching timers.

3. The method of claim 1, wherein the specific bearer type providing high data bit rate is selected from HSPA bearer and HSPA+bearer.

4. The method according to claim 1, wherein modifying the initial multiple radio access bearer configuration is performed in the radio access network.

5. The method according to claim 1, wherein detecting at least one PS service comprises a data packet inspection of the CS+PS call traffic.

6. The method according to claim 5, wherein data packet inspection is performed in the radio access network or in the core network.

7. The method according to claim 1, wherein detecting at least one PS service comprises triggering a request of high data bit rate from at least one core network entity involved in setting up the detected service.

8. The method according to claim 6, wherein detecting at least one PS service is performed in the core network and further comprises sending an indication of QoS parameters for the detected service from the core network to the radio access network.

9. A Radio Access Network entity, comprising a processor, configured to perform the method defined in accordance with claim 1.

10. A system for configuring radio access bearers in mobile networks, comprising a Radio Access Network entity having a processor that is configured to perform the method defined in accordance with claim 1.

11. The system according to claim 10, wherein the Radio Access Network entity further comprises a data packet inspection module configured to detect at least one PS service in the CS+PS call traffic; or
    wherein the system further comprises a Core Network entity comprising a data packet inspection module configured to detect at least one PS service in the CS+PS call traffic.

12. The system according to claim 10, further comprising a Core Network entity configured to set up the detected service and comprising a triggering module configured to trigger a request of the high data bit rate.

13. The system according to claim 11, wherein the system comprises the Core Network entity, which further comprises a communications interface configured to send an indication of QoS parameters for the detected service to the radio access network entity.

* * * * *